(12) United States Patent
Waggoner et al.

(10) Patent No.: US 9,498,086 B2
(45) Date of Patent: Nov. 22, 2016

(54) ADJUSTABLE ADDITIVE CARTRIDGE SYSTEMS

(71) Applicant: SAMSARA BOTTLE SYSTEM, INC., Sarasota, FL (US)

(72) Inventors: Garrett S. Waggoner, Sarasota, FL (US); Andrew Gay, Mill Creek, WA (US); Leo Riza, Sarasota, FL (US); Erkan Riza, Sarasota, FL (US)

(73) Assignee: Cirkul, Inc., Sarasota, FL (US)

( * ) Notice: Subject to any disclaimer, the term of this patent is extended or adjusted under 35 U.S.C. 154(b) by 0 days.

(21) Appl. No.: 14/948,225

(22) Filed: Nov. 20, 2015

(65) Prior Publication Data

US 2016/0150914 A1 Jun. 2, 2016

Related U.S. Application Data

(60) Provisional application No. 62/083,129, filed on Nov. 21, 2014.

(51) Int. Cl.
*A47J 43/27* (2006.01)

(52) U.S. Cl.
CPC ...................... *A47J 43/27* (2013.01)

(58) Field of Classification Search
CPC ................................ A47G 19/24; A47J 43/27
USPC ............................ 366/130; 222/142.1, 145.5
See application file for complete search history.

(56) References Cited

U.S. PATENT DOCUMENTS

| | | | |
|---|---|---|---|
| 1,674,233 A * | 6/1928 | Williams | ............... A47G 19/24 222/142.1 |
| 2,073,273 A | 3/1937 | Wetstein | |
| 3,347,403 A | 10/1967 | Lehrman | |
| 3,463,361 A | 8/1969 | Cook et al. | |
| 4,221,291 A | 9/1980 | Hunt | |
| 4,315,570 A | 2/1982 | Silver | |
| 4,785,974 A | 11/1988 | Rudick et al. | |
| 4,892,125 A | 1/1990 | Rudick et al. | |
| 5,094,861 A | 3/1992 | D'Auguste | |
| 5,246,139 A | 9/1993 | Duceppe | |
| 5,707,353 A * | 1/1998 | Mazer | ................... A61J 7/0046 604/78 |
| 5,899,363 A | 5/1999 | Bliss, III et al. | |

(Continued)

*Primary Examiner* — David Sorkin
(74) *Attorney, Agent, or Firm* — John F. Rollins (57) ABSTRACT

An adjustable additive cartridge that provides adjustable metering of additive to a base fluid as the base fluid is flowing through the cartridge. A spout is mounted for limited rotation within a base element of the cartridge. Rotation of the spout results in varying degrees of flow of additive into a base fluid flow path through the cartridge. The cartridge may be used with a portable beverage container, such as a sports bottle or off-the-shelf water bottle. The supply of base fluid in a container used with the cartridge may be kept in an unmixed, pure state, and other cartridges, each having different additives (i.e., flavors) may be used interchangeably with the same base fluid supply. The cartridge allows a consumer/user to experience different additives, such as different flavors or supplement compositions, for a given supply of base liquid in a single container. A check valve on the cartridge prevents backflow of the base fluid. An integrated filter for filtering base fluid flowing into the cartridge may be provided. The additive cartridge may be sealed to provide for extended storage and to provide a user/consumer with evidence of integrity, quality and/or tampering prior to purchase and/or use. Visual and tactile indicators of the amount of additive being added to a base fluid may be provided. A container may retain a spare additive adjustable cartridge on the container.

20 Claims, 12 Drawing Sheets

(56) References Cited

U.S. PATENT DOCUMENTS

| | | |
|---|---|---|
| 5,919,360 A | 7/1999 | Contaxis, III et al. |
| 5,984,141 A | 11/1999 | Gibler |
| 6,010,034 A | 1/2000 | Walthers |
| 6,136,189 A | 10/2000 | Smith et al. |
| 6,165,523 A | 12/2000 | Story |
| 6,180,149 B1 | 1/2001 | Gramm |
| 6,209,757 B1 | 4/2001 | Dumont |
| 6,263,924 B1 | 7/2001 | Grosser |
| 6,705,490 B1 | 3/2004 | Lizerbram |
| 6,705,491 B1 | 3/2004 | Lizerbram et al. |
| 6,820,740 B1 | 11/2004 | Spector |
| 6,959,839 B2 | 11/2005 | Roth et al. |
| 7,306,117 B2 | 12/2007 | Roth et al. |
| 7,503,453 B2 | 3/2009 | Cronin et al. |
| 7,533,786 B2 | 5/2009 | Woolfson et al. |
| 7,568,576 B2 | 8/2009 | Sweeney, Jr. et al. |
| 7,909,210 B2 | 3/2011 | Roth et al. |
| 7,947,316 B2 | 5/2011 | Kirschner et al. |
| 8,083,055 B2 | 12/2011 | Simonian et al. |
| 8,141,700 B2 | 3/2012 | Simonian et al. |
| 8,167,174 B2 | 5/2012 | Berger |
| 8,182,683 B1 | 5/2012 | Allen |
| 8,230,777 B2 | 7/2012 | Anson et al. |
| 8,302,803 B1 | 11/2012 | Greenberg et al. |
| 8,313,644 B2 | 11/2012 | Harris et al. |
| 8,453,833 B2 | 6/2013 | Porter |
| 8,541,039 B2 | 9/2013 | Lackey et al. |
| 8,590,753 B2 | 11/2013 | Marina et al. |
| 8,684,231 B2 | 4/2014 | Lane et al. |
| 8,893,927 B2 | 11/2014 | Olson et al. |
| 8,931,634 B2 | 1/2015 | Anderson |
| 9,090,395 B2 | 7/2015 | Koumans |
| 2004/0188280 A1 | 9/2004 | Young |
| 2004/0262331 A1 | 12/2004 | Woolfson et al. |
| 2008/0149585 A1 | 6/2008 | Valentine |
| 2011/0006071 A1 | 1/2011 | Koumans |
| 2011/0089059 A1 | 4/2011 | Lane et al. |
| 2011/0259769 A1 | 10/2011 | Salinas |
| 2012/0000880 A1 | 1/2012 | Im |
| 2013/0008919 A1 | 1/2013 | Honan et al. |
| 2013/0319915 A1 | 12/2013 | Gellibolian et al. |
| 2014/0230659 A1 | 8/2014 | Waggoner et al. |

\* cited by examiner

ADJUSTABLE ADDITIVE CARTRIDGE SYSTEMS

CROSS-REFERENCE TO RELATED APPLICATIONS

This application claims benefit of priority under all applicable provisions, laws and treaties, from U.S. provisional patent application Ser. No. 62/083,129 titled "ADJUSTABLE ADDITIVE CARTRIDGE SYSTEMS," filed on Nov. 21, 2014, the disclosure and subject matter of which is hereby incorporated by reference in its entirety. Where an element or subject matter of this application or a part of the description, claims or drawings in the aforementioned provisional application is not otherwise contained in this application, that element, subject matter or part is incorporated by reference in this application for the purposes of any and all applicable rules, procedures or laws.

TECHNICAL FIELD

This document relates to fluid storage, dispensing and delivery systems for beverages and other products. More specifically, this document relates to dispensing and delivery systems that utilize cartridges for providing an additive, such as flavoring concentrate or nutritional or vitamin supplements, in controlled and adjustable amounts, to a base liquid, such as water, as the base liquid is dispensed through the cartridge. The document also relates to cartridge and container systems that enable a user to utilize multiple cartridges, each having a different additive, interchangeably with a given supply of base liquid, such that the additive can be combined with the base liquid for consumption or other use, while a supply of base liquid, such as that in container (i.e., water bottle) remains in a pure, unmixed state.

BACKGROUND

The prior art includes various devices for providing additives to a base liquid. Such devices include pre-mix systems, such as those described in U.S. Pat. No. 7,306,117, in which a predetermined amount of additive is dispensed into a base liquid within the container and mixed therewith prior to consumption. Prior art systems also include devices in which an additive is provided to a base fluid as it is dispensed from a container. Such delivery systems are exemplified by U.S. Pat. No. 8,230,777, which describes a dispensing system in which a base liquid flows through a supplement area containing solid supplements, and U.S. Pat. No. 8,413,844, which describes a water dispenser (pitcher) having a filter and an additive chamber in which the additive is dispensed as water is poured from the dispenser.

SUMMARY

One aspect of the invention provides an adjustable additive cartridge that provides adjustable metering of additive to a base fluid as the base fluid is flowing through the cartridge. The cartridge may be readily adapted to a portable container, such as a sports bottle or off-the-shelf water bottle. Because the cartridge provides additive to the base fluid as it flows through the cartridge, an additive and base fluid mixture can be dispensed while the supply of base fluid contained within a container used with the cartridge may be kept in an unmixed, pure state. Moreover, aspects of the invention provide for the use of multiple cartridges, each having different additives (i.e., flavors) interchangeably with a given container and given supply of base fluid. Modular additive cartridges according to aspects of the invention may be used with containers storing a supply of base fluid to allow a consumer/user to experience different additives, such as different flavors or supplement compositions, with the same supply of base liquid.

Yet another aspect of the invention provides an additive cartridge with an integrated filter for filtering base fluid flowing into the cartridge.

Yet another aspect of the invention provides an additive cartridge that is sealed to provide for extended storage and to provide a user/consumer with evidence of integrity, quality and/or tampering prior to purchase and/or use.

Yet another aspect of the invention provides an additive cartridge with visual and tactile indicators of the amount of additive being added to a base fluid.

Yet another aspect of the invention provides a cartridge and container combination wherein the container includes elements for retaining a spare additive adjustable cartridge on the container.

Unless otherwise defined, all technical and scientific terms used herein have the same meaning as commonly understood by one of ordinary skill in the art to which the described invention pertains. Although other implementations, methods and materials similar to those described herein can be used to practice the invention, suitable and example implementations, methods and materials are described below. All publications, patent applications, and other references mentioned herein are incorporated by reference in their entirety. In case of conflict, the present specification, including definitions, will control. In addition, the materials, methods and examples are illustrative only and are not intended to be limiting in any way. The details of one or more example implementations of the invention are set forth in the accompanying drawings and the description below. Other features, objects and advantages of the invention will be apparent from the description and drawings, and from the claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
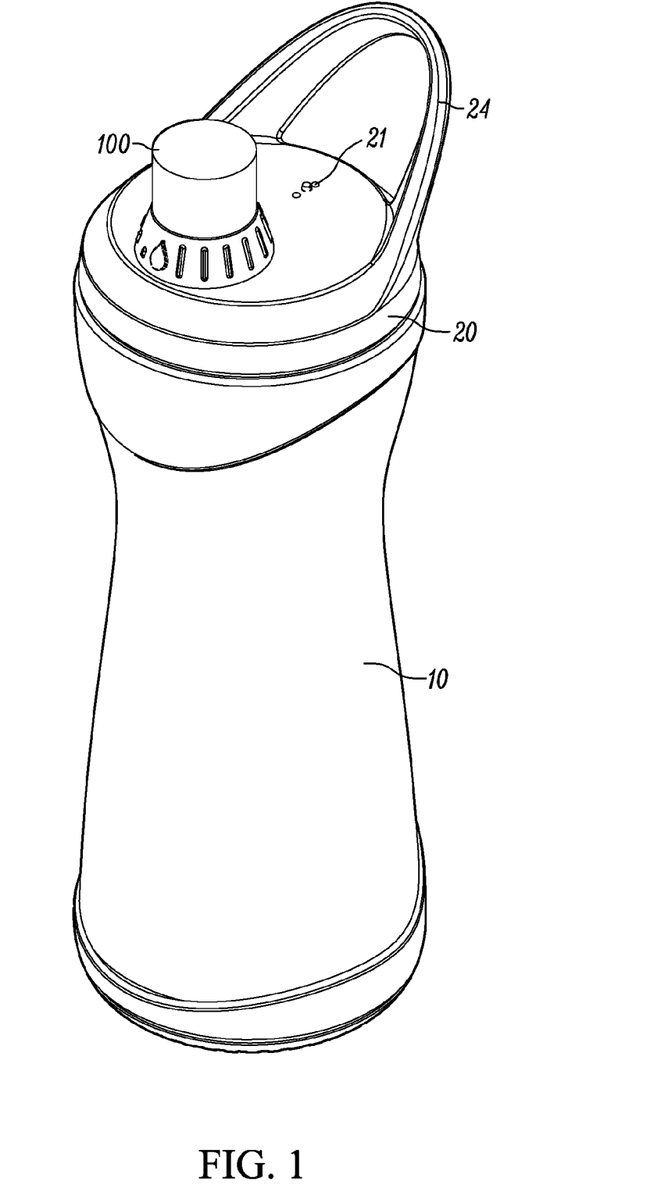
FIG. 1 is a perspective view of an example cartridge and container system according to an aspect of the invention.
Figure 2:
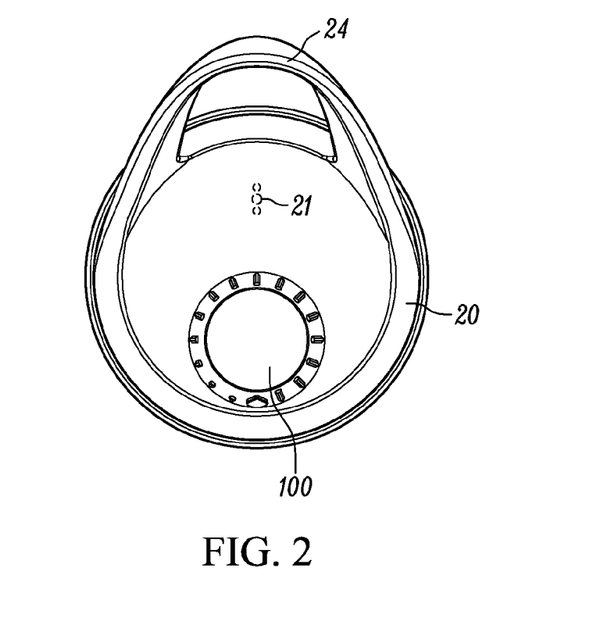
FIG. 2 is a top view of the cartridge and container system of FIG. 1.

Referring to FIGS. 1 and 2, an example adjustable additive cartridge 100, according to an aspect of the invention, may be used in combination with a container 10, such as a portable water bottle, having a cap 20 in threaded and sealing engagement with the container body. The cap 20 may include a carrying handle 24 formed integrally therewith. One or more vent holes 21 are provided in the cap 20 to permit inflow of air to the interior of the container 20.

Figure 3:
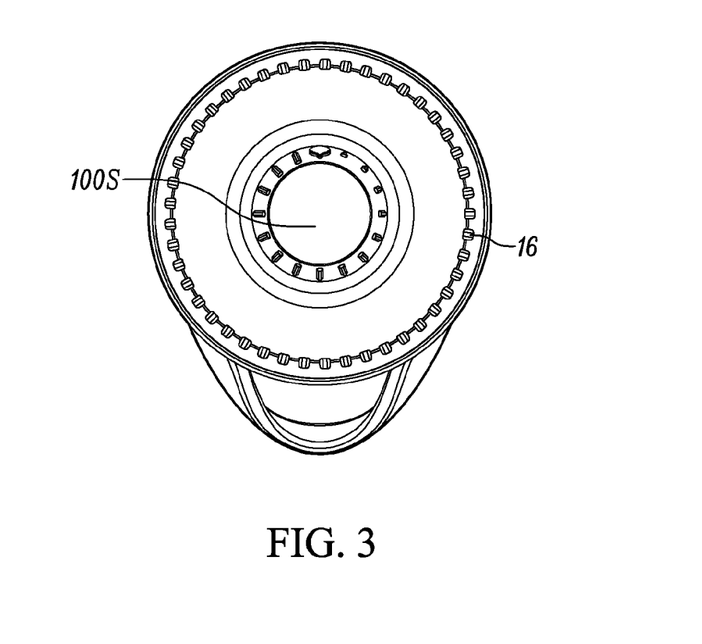
FIG. 3 is a bottom view of the cartridge and container system of FIG. 1.

Referring additionally to FIG. 3, which is a bottom view of the container 20 of FIG. 1, according to a further aspect of the invention, containers used in combination with the adjustable additive cartridge may include implements for securely storing one or more spare cartridges 100S thereon.

Figure 4:
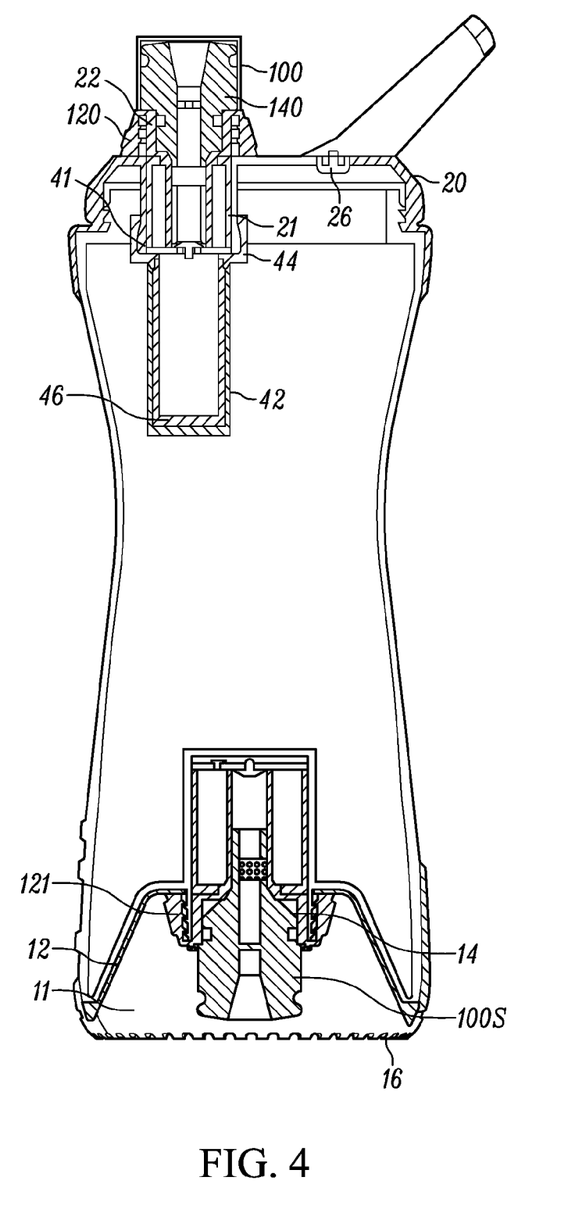
FIG. 4 is a cross-section of the cartridge and container system of FIG. 1.
Figure 5:
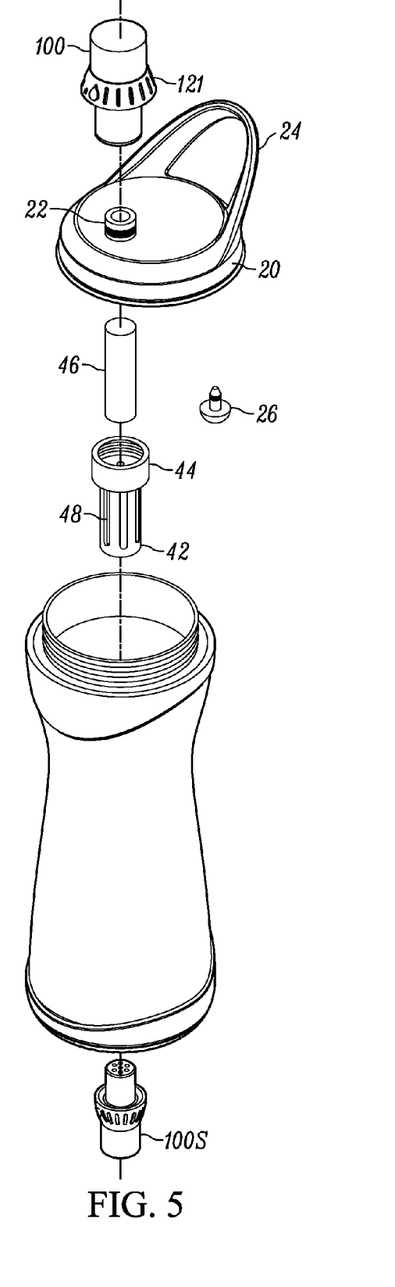
FIG. 5 is an exploded, perspective view of the cartridge and container system of FIG. 1.

FIGS. 4 and 5 illustrate in further detail the primary components of an example container and cartridge system according to aspects of the invention. Cartridge 100, which is in use, is secured to container cap 20, which includes a threaded cartridge-retaining collar 22 to which a correspondingly threaded retaining portion 121 of the cartridge base 120 is secured. As will be recognized, other implements may be used for providing secure, sealing engagement of the cartridge 100 to the cap, such as snap fit elements, O-rings and the like.

Figure 6:
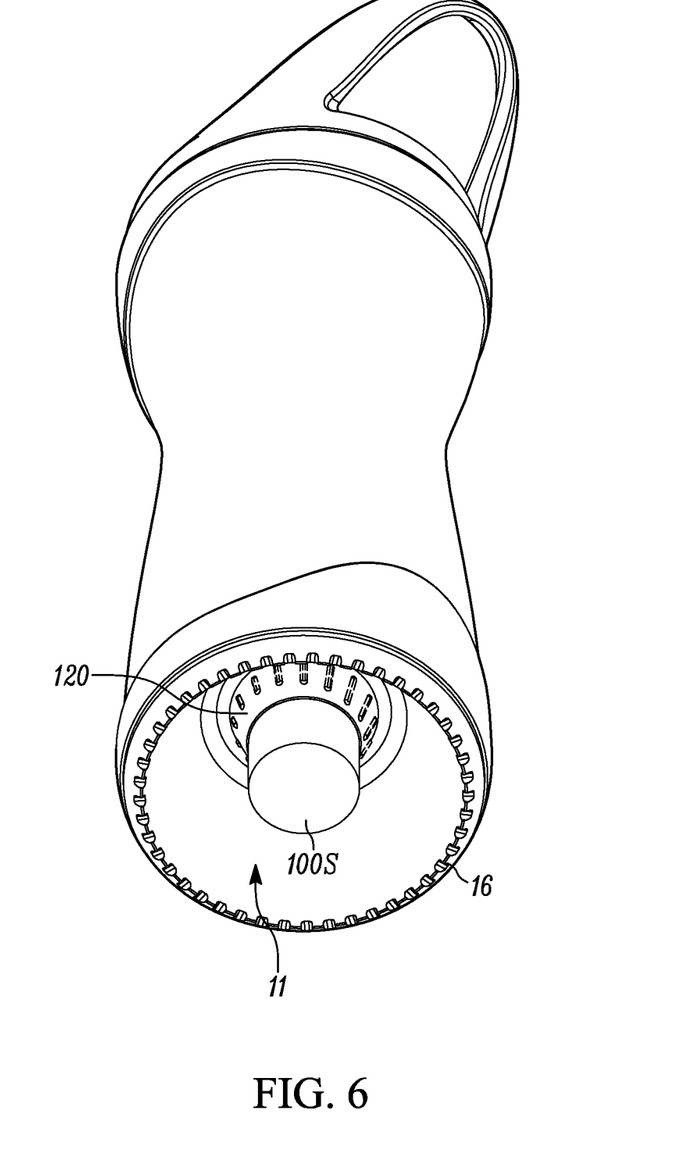
FIG. 6 is a bottom perspective view of the cartridge and container system of FIG. 1.
Figure 7:
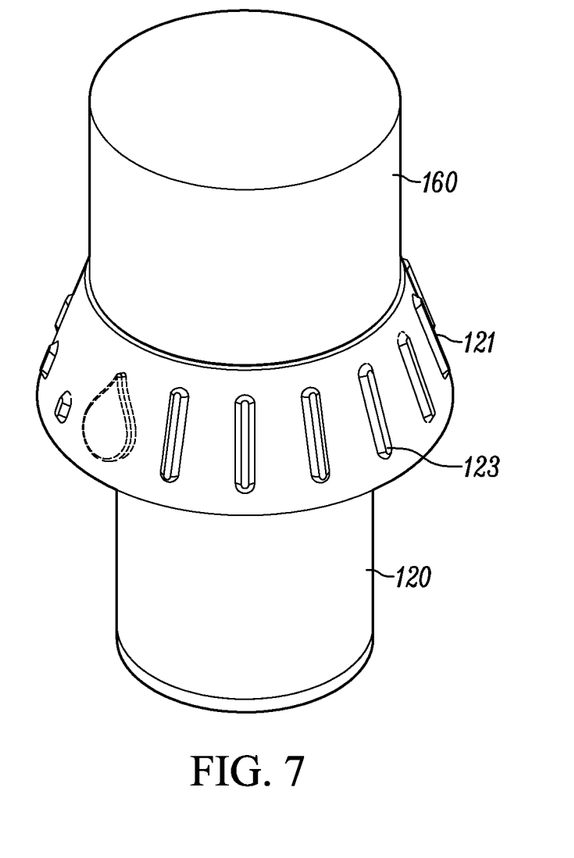
FIG. 7 is a perspective view of an example cartridge according to an aspect of the invention.
Figure 8:
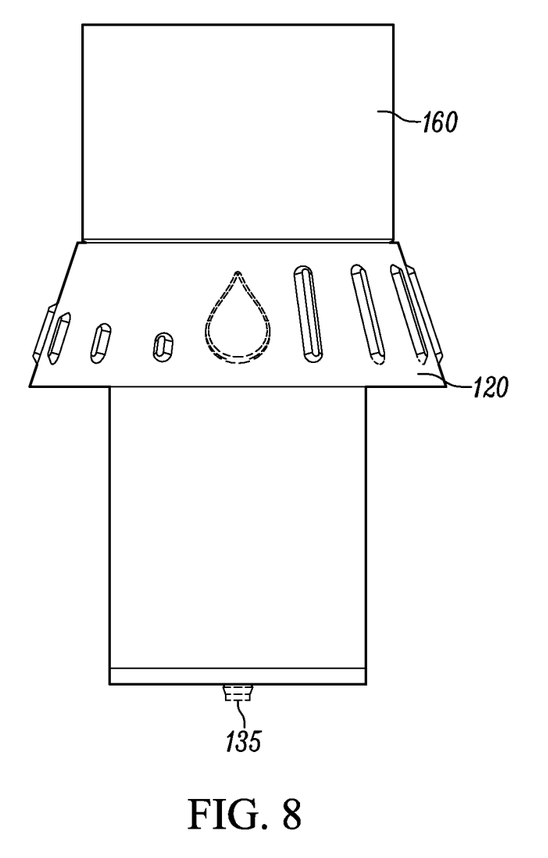
FIG. 8 is a side view of the cartridge of FIG. 7.
Figure 9:
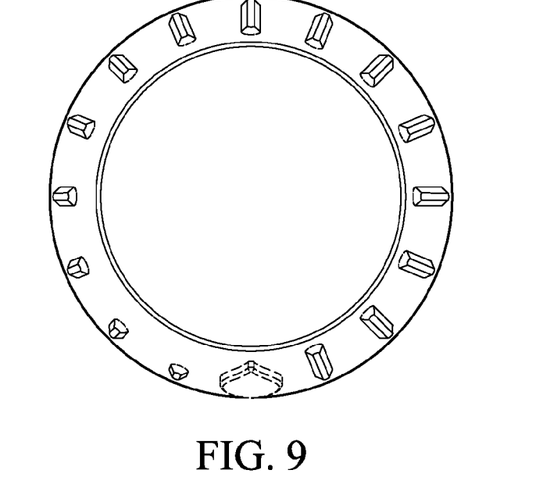
FIG. 9 is a top view of the cartridge of FIG. 7.
Figure 10:
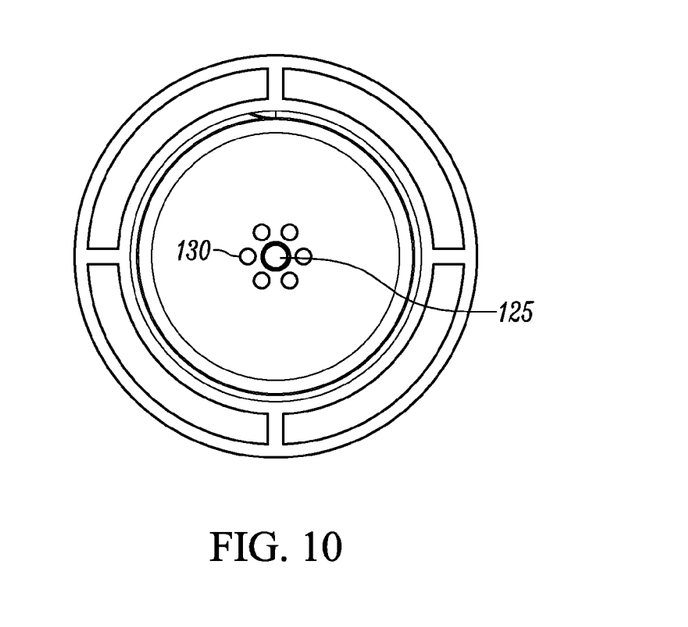
FIG. 10 is a bottom view of the cartridge of FIG. 7.

In a similar fashion, and referring additionally to FIG. 6, spare cartridge 100S may be secured to a bottom portion of the container 10 and housed within a recess 11 formed therein. A spare cartridge retaining collar 14 also formed in the container bottom or fastened thereto, provides for threaded engagement of a threaded retaining portion 121 on the base 120 of the spare cartridge 100S. A number of gripping elements, such as gripping teeth 16 may be formed on the bottom of the container 10 for preventing the container from slipping on a surface.

A filter assembly (see FIGS. 4 and 5, particularly) may include a filter housing 42 having at least one passage 48 therein for permitting inflow of base fluid from the container, and a threaded collar 44 for engaging a threaded filter retaining collar 21 (FIG. 4) on the underside of cap 20. A porous, activated carbon filtration element 46, which may be solid or annular, may be housed within the filter housing 42 for filtering the base liquid contained in container 10 as the base liquid flows from the container through the filtration assembly and into the cartridge 100. A silicone air inlet valve 26 is provided in the cap for permitting the flow of air into the container as liquid is dispensed, while preventing outflow.

FIGS. 7-14 illustrate details of an example cartridge 100 according to aspects of the invention. Cartridge 100 may include a spout sealing cap 160, which may be snap fit onto a cartridge base 120, which includes a tapered and threaded retaining collar 121, having visual and tactile indicia 123 thereon for indicating a flavor intensity provided by the adjustable cartridge as will be explained. Spout sealing cap 160, and the cartridge 100 as a whole may be provided with a tamper proof element (not shown) such as a shrink-wrapped frangible plastic membrane provided around the entire cartridge so as to assure quality, safety and a tamper-free state of the cartridge prior to purchase and use.

Figure 11:
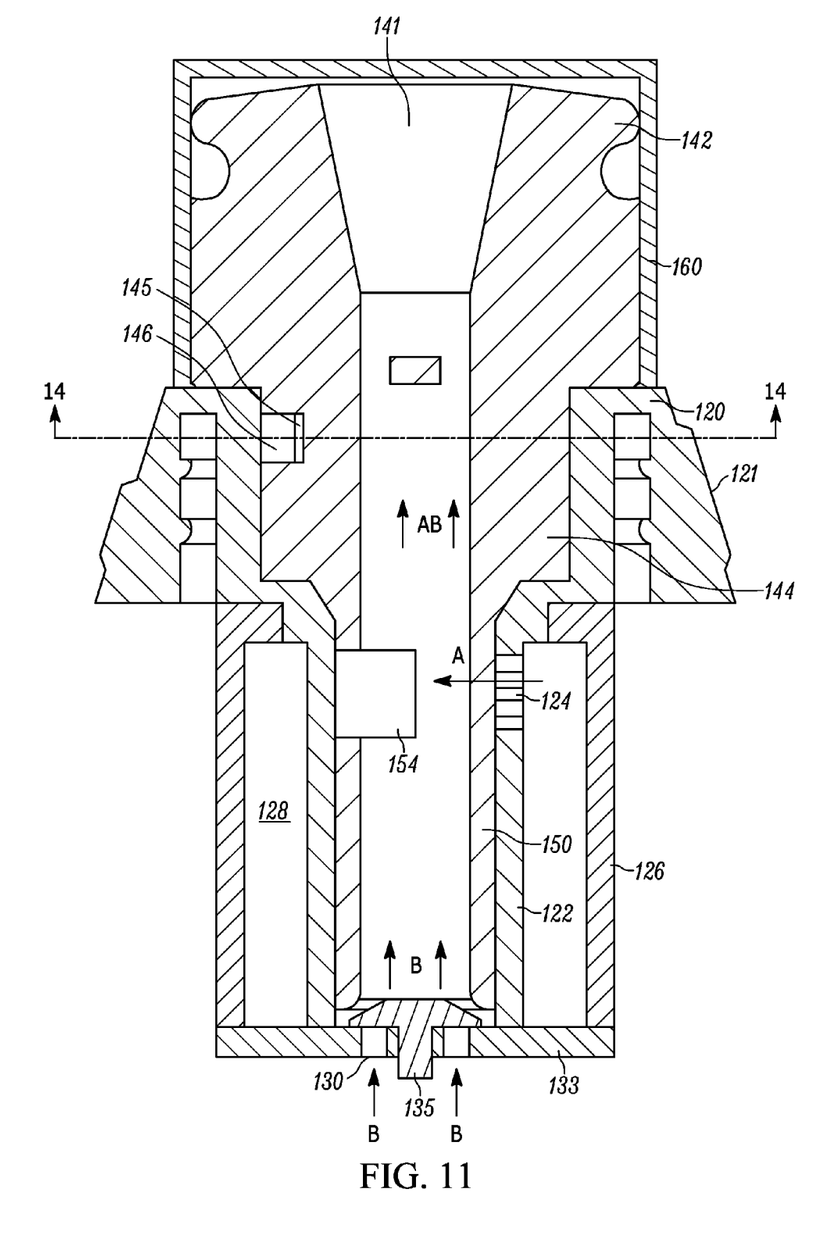
FIG. 11 is a cross-section of the cartridge of FIG. 7 in an assembled configuration.
Figure 12:
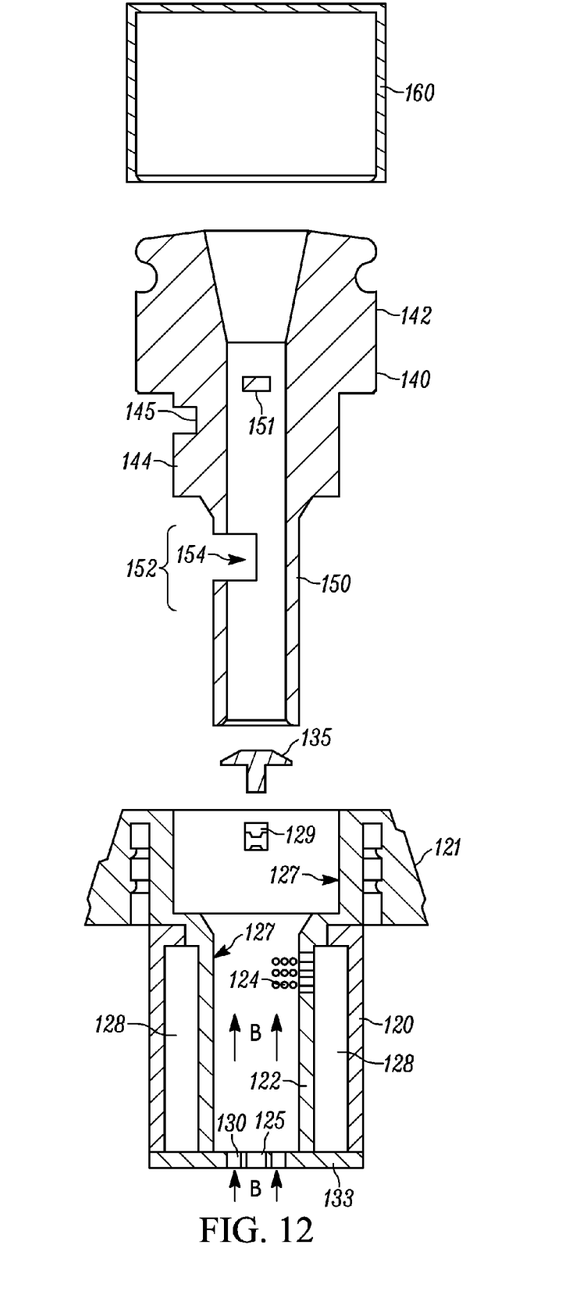
FIG. 12 is an exploded, cross-section of the cartridge of FIG. 7.
Figure 13:
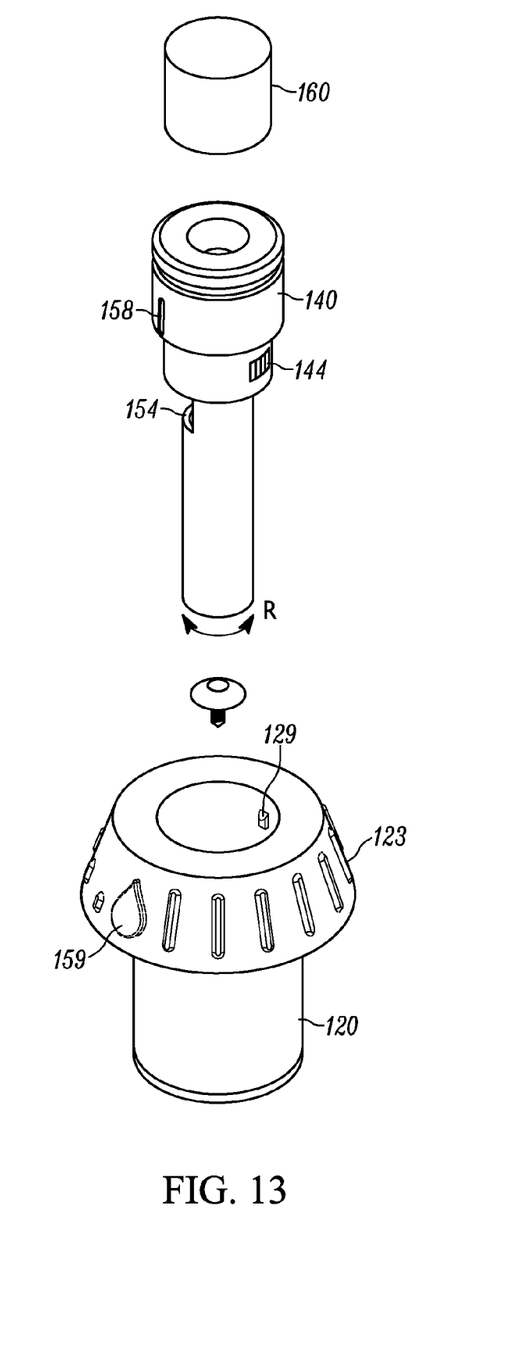
FIG. 13 is an exploded, perspective view of the cartridge of FIG. 7.

Referring particularly to FIGS. 11 and 12, the cartridge 100 may generally comprise three components—a spout 140, cartridge base 120 and spout sealing cap 160. Spout 140 and cartridge base 120 cooperate to provide for adjustable flow of additive from the cartridge to a base fluid flow path, referenced by arrows "B" in FIG. 11. An additive flow path, referenced by arrow "A" in FIG. 11 (which shows the additive flow path obstructed by the spout stem 150) is also defined within the cartridge. Base fluid flow and additive flow are combined in an additive and base fluid combined flow path referenced by arrows "AB" in FIG. 11.

Cartridge base 120 may include an inner annular wall 122, an outer annular wall 126 and a cartridge bottom wall 133, which define an annular additive reservoir 128. Bottom wall 133 may include one or more inlet ports 130 (see also FIG. 10), which provide for the entry of base fluid into the cartridge, for example, from an outlet of the filter assembly described above. A base fluid flow check valve 135 may be secured in the bottom wall 133 and may include a flexible silicone rubber "button" shaped element with a stem portion being frictionally secured in an aperture 125 through the bottom wall 133 of the cartridge 100. Check valve 135 ensures only one-way flow of the base fluid into the cartridge 100 and prevents backflow into the filter assembly and/or container 10. As will be recognized, the dimensions of inlet ports 130, as well as the materials and dimensions of check valve 135 may be varied to achieve appropriately controlled flow rates of the base fluid through the cartridge 100.

To provide for the metered and controlled flow of additive from the additive reservoir 128 and into the base fluid flow path, as will be described further below, one or more additive metering ports 124 may be formed in the inner annular wall 122 of cartridge base 120. Metering ports 124 may extend in a matrix pattern around a portion of the inner annular wall 122. Inner annular wall 122 may define a portion of a spout receiving annulus 127 for receiving and securing the spout 140 for rotational movement therein. An interference projection or tab 129 is formed on the cartridge base 120 for engaging metering adjustment detents on the spout 140 as will be described.

Spout 140 may include a top outlet section 142, a detent section 144 and an annular stem 150. When assembled with cartridge base 120, annular stem 150 extends into the annular space 127 defined by the inner annular wall 122. Annular stem 150 includes an additive metering section 152 with an additive flow slot 154 formed in the stem and extending a portion of the circumference of the stem. When the spout 140 is assembled with the base 120, spout 140 may rotate in the direction of arrow "R" (FIG. 13) such that additive metering section 152 may permit or obstruct flow through the metering ports 124. More particularly, metering section may be rotated to a position where the surface of stem 150 completely obstructs the metering ports 124 (as shown in FIG. 11), in which case no additive is permitted to flow into the base fluid flow path (corresponding to a "water only" setting on the cartridge, for example). Further, when flow of additive is desired, spout 140 and metering section 152 may be rotated to a position where the slot 154 is located adjacent some or all of the ports 124, providing for corresponding levels of flow of additive through ports 124 and into the base fluid flow path. In this manner, the amount of additive mixed with the base fluid may be adjusted by rotation of the spout 140 within the cartridge base.

According to another aspect of the invention, collar 121 may be provided with visual and tactile indicia corresponding to the additive flow settings provided for various rotational positions of the spout 140 within the cartridge base. An index or other indicator 158 (FIG. 13) may be provided on the spout 140 such that it aligns with one of the indicators 123 on the base collar 121 for a given rotational position. A "water-only" indicator 159 may also be provided on the collar 121, corresponding with a fully closed position of the additive flow path.

Figure 14:
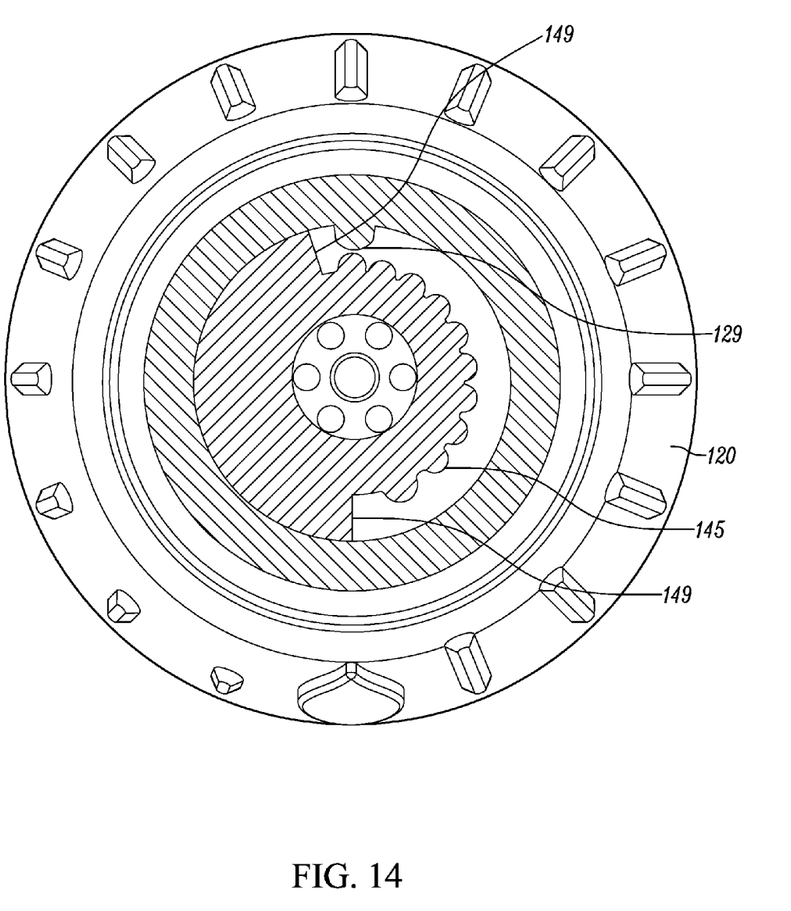
FIG. 14 is a top, sectional view of the cartridge of FIG. 7 taken in plane 14-14 of FIG. 11.

According to another aspect of the invention, the cartridge base 120 and spout 140 are provided with elements that ensure a positive rotational position of the spout 140 relative to the cartridge base. Referring additionally to FIG. 14, which is a cutaway view of the cartridge base 120 and spout 140 taken into plane 14-14 in FIG. 11, an interference tab or projection 129 extends into an annular slot 146 formed in the detent portion 144 of spout 140. The slot may extend only partially around the detent portion 144 to provide stopping surfaces 149 (FIG. 14) that engage projection 129 and thereby limit the rotation of spout 140 within the cartridge base 120. A series of projecting tabs or detent elements 145 extend in a manner that cause frictional engagement with projection 129 (for clarity in description, FIG. 14 shows the elements 129 and 145 not touching, it being understood that some overlap, deformation and friction will be present). The interaction of interference tab 129 with detent elements 145 provides for positive rotational positions of the spout 140 within the base 120. These positions correspond with the indicia on collar 121 such that the user can gauge the rotational position of the spout 140 within the base 120, and the corresponding level of additive being provided for mixing with the base fluid.

Threaded retaining collar 121 of cartridge base 120 is provided with indicia to indicate the mount of flavoring intensity (i.e., with vertical projections of increasing size). A corresponding index or pointer 158 on the spout indicates the rotational position of the spout 140 within the base 120. According to an aspect of the invention, the cartridge may be configured to a "water-only" mode, as indicated by the droplet indicator 159, where the flavor metering ports 124 would be completely blocked by the flavor metering section 152 because of the corresponding rotational position of the stem 150 within cartridge base 120. In this mode, unflavored and filtered base liquid (water) may be dispensed from the container without any complex reconfiguring required by the consumer. The one-way or check valve 135 prevents backflow of water and/or flavor concentrate into the container interior.

As will be recognized, the flow of base fluid through the spout stem 150 will cause the additive to flow through the metering ports 124 such that the additive mixes with the base fluid in a controlled manner. A user may adjust the amount of additive added to the base liquid by rotating the spout 140 within the cartridge base. The dimensions of the metering ports 124 may be selected to provide appropriate flow of additive. Metering ports having a diameter of approximately 0.03 inches have been found to provide for suitable metering of additive liquid, while permitting the retention (non-leakage) of additive liquid from the additive reservoir and preventing flow of the base fluid through the metering ports and into the reservoir.

As will be recognized, the diameter of metering ports may be varied depending on the viscosity of the additive liquid and other parameters such that flow occurs in appropriate quantities. A turbulence-creating projection 151 may be provided in the flow path to enhance the mixing and uniform dilution of the additive within the base fluid.

The check valve 135 and inlet ports 130 may be configured in appropriate dimensions to provide for controlled flow of the base fluid over a range of container pressures (i.e., such as those caused by a user squeezing the container in the case of a flexible container). For additional control of the base fluid flow through the cartridge, container 10 may be provided as a rigid (i.e., not substantially squeezable or flexible) container 10 so that user compression of the container does not influence flow of the base liquid through the cartridge or additive, where instead fluid exits the container by gravity with the container is inverted and flows at a more uniform rate. An air inlet valve 26 on the cap 20 (FIG. 3) may provide replacement air (i.e., and prevent a vacuum) as the base fluid flows from the container interior. The air inlet valve 26 may be a silicone "button" shaped valve with a stem that fits and is frictionally and/or compressively within an aperture in the cap 20 and a valve face that seals one or more vent holes 21 against flow out of the container, while permitting the flow of air into the container.

As will also be recognized, suitable thermoplastic polymers may be used to form the various aforementioned elements, including polyethylene terepthalate (PET), polycarbonate, high-density polyethylene (HDPE) and others.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the concepts described herein.

What is claimed is:

1. An adjustable additive cartridge for containing a supply of additive and for permitting a user to adjust the amount of additive to be mixed with a base fluid as the base fluid flows from a base fluid container comprising:
    a cartridge base including a retaining collar for engaging a mouth of the base fluid container and thereby retaining the cartridge base thereon,
    the cartridge base having a base fluid flow path defined therein for permitting flow of a base fluid from the base fluid container through the cartridge base;
    an additive reservoir on the cartridge base for containing a supply of additive, the cartridge base further defining an additive flow path for permitting flow of additive from the additive reservoir to the base fluid flow path;
    a spout cooperating with the cartridge base and including a spout fluid flow path defined therein, the spout fluid flow path permitting flow of additive and base fluid mixture from the cartridge base fluid flow path to a dispensing end of the spout; and
    an additive metering section disposed in the additive flow path for varying the flow of additive flowing in the additive flow path to the base fluid flow path;
    an additive metering adjuster for permitting a user to adjust the additive metering section, the additive metering adjuster being mounted for rotatable movement relative to the cartridge base, wherein rotation of the additive metering adjuster by the user causes the additive metering section to vary the flow of additive in the additive and base fluid mixture.

2. The cartridge of claim 1, wherein the metering section comprises a surface on the spout and wherein the additive metering adjuster comprises an upper portion of the spout that may be gripped and rotated by the user.

3. The cartridge of claim 1, wherein the metering section comprises at least one port defined in the cartridge base, the port also defining at least part of the additive flow path.

4. The cartridge of claim 1, wherein the spout operates as the additive metering adjuster and cooperates with the cartridge base and is rotatable with respect thereto to adjust the flow of additive flowing from the additive flow path to the base fluid flow path.

5. The cartridge of claim 1, wherein the additive reservoir is defined as an annular space between inner and outer annular walls of the cartridge base, and wherein the metering section comprises a matrix of apertures formed on the inner annular wall of the cartridge base.

6. The cartridge of claim 5, wherein the spout includes an annular stem that fits within a corresponding annulus in the cartridge base, and wherein the metering section further comprises a surface on the spout annular stem that may selectively obstruct one or more of the apertures.

7. The cartridge of claim 1, further comprising a check valve for preventing backflow of the base fluid.

8. The cartridge of claim 1, further comprising a turbulence-creating projection disposed within the spout fluid flow path to enhance mixing of the additive and base fluid mixture.

9. The cartridge of claim 1, wherein the base includes a threaded collar for engaging a correspondingly threaded portion of a container.

10. The cartridge of claim 1, wherein the spout is rotatable within the cartridge base and wherein the spout includes a plurality of metering adjustment detents and wherein the cartridge base includes an interference projection adapted to engage the metering adjustment detents to secure the spout in a fixed rotational position relative to the cartridge base.

11. An adjustable additive delivery system for permitting a user to adjust the amount of additive to be mixed with a base fluid comprising:
  a base fluid container having an interior space for containing the base fluid;
  a cartridge for delivering a desired amount of additive to the base fluid as the base fluid passes through the cartridge, the cartridge comprising:
  i) a cartridge base including a retaining collar for engaging a mouth of the base fluid container and thereby retaining the cartridge base thereon, the cartridge base having a base fluid flow path defined therein for permitting flow of a base fluid from the base fluid container through the cartridge base, an additive reservoir on the cartridge base for containing a supply of additive, the cartridge base further defining an additive flow path for permitting flow of additive from the additive reservoir to the base fluid flow path;
  ii) a spout cooperating with the cartridge base and including a spout fluid flow path defined therein, the spout fluid flow path permitting flow of additive and base fluid mixture from the cartridge base fluid flow path to a dispensing end of the spout; and
  iii) an additive metering section disposed in the additive flow path for varying the flow of additive flowing in the additive flow path to the base fluid flow path;
  iv) an additive metering adjuster for permitting a user to adjust the additive metering section, the additive metering adjuster being mounted for rotatable movement relative to the cartridge base, wherein rotation of the additive metering adjuster by the user causes the additive metering section to vary the flow of additive in the additive and base fluid mixture.

12. The system of claim 11, wherein the metering section comprises a surface on the spout and wherein the additive metering adjuster comprises an upper portion of the spout that may be gripped and rotated by the user.

13. The system of claim 11, wherein the metering section comprises at least one port defined in the cartridge base, the port also defining at least part of the additive flow path.

14. The system of claim 11, wherein the spout operates as the additive metering adjuster and cooperates with the cartridge base and is rotatable with respect thereto to adjust the flow of additive flowing from the additive flow path to the base fluid flow path.

15. The system of claim 11, wherein the additive reservoir is defined as an annular space between inner and outer annular walls of the cartridge base, and wherein the metering section comprises a matrix of apertures formed on the inner annular wall of the cartridge base.

16. The system of claim 15, wherein the spout includes an annular stem that fits within a corresponding annulus in the cartridge base, and wherein the metering section further comprises a surface on the spout annular stem that may selectively obstruct one or more of the apertures.

17. The system of claim 11, further comprising a check valve for preventing backflow of the base fluid.

18. The system of claim 11, further comprising a turbulence-creating projection disposed within the spout fluid flow path to enhance mixing of the additive and base fluid mixture.

19. The system of claim 11, wherein the base includes a threaded collar for engaging a correspondingly threaded portion of the container.

20. The system of claim 11, wherein the spout is rotatable within the cartridge base and wherein the spout includes a plurality of metering adjustment detents and wherein the cartridge base includes an interference projection adapted to engage the metering adjustment detents to secure the spout in a fixed rotational position relative to the cartridge base.

* * * * *